United States Patent
Lin et al.

(10) Patent No.: US 8,874,625 B2
(45) Date of Patent: Oct. 28, 2014

(54) METHOD, APPARATUS AND SYSTEM FOR ACCESSING REMOTE FILES

(75) Inventors: Yan Lin, Shenzhen (CN); Chuming Chen, Shenzhen (CN)

(73) Assignee: Sangfor Networks Company Limited, Nanshan District, Shenzhen (CN)

( * ) Notice: Subject to any disclaimer, the term of this patent is extended or adjusted under 35 U.S.C. 154(b) by 51 days.

(21) Appl. No.: 13/204,669

(22) Filed: Aug. 6, 2011

(65) Prior Publication Data

US 2012/0179731 A1     Jul. 12, 2012

(30) Foreign Application Priority Data

Jan. 10, 2011   (CN) .......................... 2011 1 0003893

(51) Int. Cl.
| | | |
|---|---|---|
| *G06F 17/30* | (2006.01) | |
| *H04L 29/08* | (2006.01) | |
| *G06F 21/62* | (2013.01) | |
| *H04L 29/06* | (2006.01) | |

(52) U.S. Cl.
   CPC ...... *H04L 63/102* (2013.01); *G06F 2221/2107* (2013.01); *H04L 67/06* (2013.01); *G06F 21/6218* (2013.01); *H04L 2463/101* (2013.01); *G06F 17/30203* (2013.01)
   USPC ...................................................... 707/827

(58) Field of Classification Search
   USPC ................ 707/3, 10, 827; 711/162; 370/389; 726/12, 24
   See application file for complete search history.

(56) References Cited

U.S. PATENT DOCUMENTS

| | | | | |
|---|---|---|---|---|
| 6,105,131 | A * | 8/2000 | Carroll .......................... | 713/155 |
| 6,557,089 | B1 * | 4/2003 | Reed et al. .................... | 711/162 |
| 7,310,714 | B2 * | 12/2007 | Kekre et al. ................... | 711/162 |
| 2004/0236752 | A1 * | 11/2004 | Han et al. ........................ | 707/10 |
| 2006/0182103 | A1 * | 8/2006 | Martini et al. ................. | 370/389 |
| 2007/0174915 | A1 * | 7/2007 | Gribble et al. .................. | 726/24 |
| 2007/0288525 | A1 * | 12/2007 | Stakutis et al. ............... | 707/200 |
| 2009/0132604 | A1 * | 5/2009 | Faraotti et al. ................ | 707/200 |
| 2010/0132029 | A1 * | 5/2010 | Chauhan et al. ................ | 726/12 |
| 2012/0110044 | A1 * | 5/2012 | Nagpal et al. ................. | 707/827 |

* cited by examiner

*Primary Examiner* — Etienne Leroux
(74) *Attorney, Agent, or Firm* — Tianhua Gu; Global IP Services

(57) ABSTRACT

The present invention relates to a method, apparatus and system for accessing remote files, wherein the method for accessing remote files comprising the following steps: obtaining download operation information for downloading a file in an operational system server; redirecting the download operation to a file server with safety space; saving a real copy of the downloaded file in the safety space and enumerating a corresponding virtual copy in the safety space. In the present invention, local file operations are redirected to the network file operations of network file storage system by redirecting the download operation on the file in the operational system server to the file server instead of being saved in the local user terminal to realize the "Not to local" effect for the key file. Even when it is power-off and then restarted, the data will not be saved in the local user terminal to achieve an effect close to "physical-like isolation", which solves the safety problems of the offline key file much better.

3 Claims, 3 Drawing Sheets

METHOD, APPARATUS AND SYSTEM FOR ACCESSING REMOTE FILES

FIELD OF THE INVENTION

The present invention relates to computer technology, more specifically, to a method, apparatus and system for accessing remote files.

BACKGROUND OF THE INVENTION

Sandbox technology, one kind of security technologies, means to run applications in a limited secure environment and to realize the logic isolation effect for data through access control. The earliest application of sandbox technology is to direct the files generated and modified by programs to customized virtual space by means of redirecting technology. When a certain program tries to play a role, security software can make it run in the sandbox firstly. If the program contains malicious act, the security software will forbid its further run. Thus no damage will be caused for the system. Subsequently, with the development of the demand of data security, the redirecting virtual technology of the sandbox also has been usually used in the "Anti-Disclosure" product.

Local redirecting technology means that any operation on a local file A is redirected to be the operation on a local copy B to protect the local real file A. The downloaded and locally saved file is actually redirected to be saved as another copy. The saving path originally set by the user only exists as a virtual file link.

In the traditional sandbox technology, one file is downloaded from a server by a user and encrypted and saved in a local hidden copy by means of local transparent encryption technology. A virtual file link is furthermore realized on the saving path for original file in the virtual workspace. The user cannot see the downloaded file completely outside the virtual workspace because the file has been redirected to the hidden copy, while a virtual copy of the copy can be seen in the virtual workspace. All operations on the copy will be redirected to the hidden copy. When the user logs out, the hidden copy is emptied automatically to realize the logic isolation effect.

FIG. 1 shows an exemplary diagram for the logic isolation of tradition sandbox technology. Referring to FIG. 1, a user accesses an operational system server and further a certain key file by means of a security gateway. The key file is encrypted and saved to the local by a local user terminal to form a copy which can only be accessed in the safety space. When the user accesses the file in the safety space, the content of encrypted and saved copy is presented to the client by means of transparent decryption. After the user logs off this session, the encrypted copy can be selected whether to be deleted automatically or not. If the automatic deletion has been adopted, the copy edited last time cannot be accessed and it is needed to download the file again by accessing the operation system again, when the user logs in the same PC again. If the automatic deletion has not been adopted, the copy edited last time can then be accessed when the user logs in the same PC again. However, there are the problems that the local encrypted file is decrypted or that the local encrypted file is deleted when it is formatted off line. The above mentioned traditional sandbox technology depends on the encryption intensity of the local data. If the intensity of the encryption algorithm is too low, there will be the possibility that the file is decrypted in off-line state. But if the intensity of the encryption algorithm is too high, it will influence the usage and the experience severely and enhance the complexity to realize the transparent encryption and decryption at the same time. Secondly, the encryption and storage causes inherent defect for the "key file" in the aspect of authority sharing, and it is hard to realize the file sharing strategy within the extent of authority.

Additionally, for the traditional sandbox technology, since the data is encrypted and saved in the local disc, the user must log in the same user terminal to access the file saved last time. Applying the logic isolation method as shown in FIG. 1, the same file cannot be shared or accessed by two different users (the user B and the user A). Besides, if the local disc is formatted or deleted artificially, the file can never be accessed again.

SUMMARY OF THE INVENTION

The objective of the present invention is to provide a method, apparatus and system for accessing remote files, referring to the above mentioned defect of the prior art.

According to the present invention, the objective stated above is achieved by the following technical solution.

A method for accessing remote files is constructed, wherein the method comprising the following steps:

obtaining download operation information for downloading a file in an operational system server;

redirecting said download operation to a file server with safety space;

saving a real copy of the downloaded file in said safety space and enumerating a corresponding virtual copy in said safety space.

Advantageously, the method further comprises:

obtaining access request information for accessing the virtual copy in said safety space;

judging whether said access request information is legal or not;

if so, allowing to access the corresponding virtual copy;

redirecting all operations on the virtual copy to said real copy.

Advantageously, a plurality of private spaces one-to-one corresponding to different user accounts are set in said safety space; each of said a plurality of private spaces is used to store the real copy downloaded by the corresponding user account respectively.

Advantageously, the method also comprises: obtaining logging-out instruction information and deleting said virtual copy.

According to the present invention, an apparatus for accessing remote files is also provided, wherein the apparatus comprising:

an information acquisiting module operable to obtain download operation information for downloading a file in an operational system server;

a redirecting module operable to redirect said download operation to a file server with safety space;

a processing module operable to save a real copy of the downloaded file in said safety space and enumerate the corresponding virtual copy in said safety space.

Advantageously, the apparatus also comprises a judging module;

said information acquisiting module also operable to obtain access request information for accessing the virtual copy in said safety space;

said judging module operable to judge whether said access request information is legal or not;

said redirecting module operable to allow to access the corresponding virtual copy and redirect all operations on the virtual copy to said real copy when said access request information is legal.

Advantageously, the apparatus also comprises a session logging-out module;

said information acquisiting module also operable to obtain logging-out instruction information;

said session logging-out module operable to delete said virtual copy when receiving said logging-out instruction information.

Advantageously, a plurality of private spaces one-to-one corresponding to different user accounts are set in said safety space; each of said a plurality of private spaces is used to store the real copy downloaded by the corresponding user account respectively.

According to the present invention, a system for accessing remote files is also provided, the system comprising a local user terminal and an operational system server in which stored remote files, wherein the system also comprising a file server with safety space; said local user terminal connects with said file server and said operational system server via a security gateway; wherein, said local user terminal operable to obtain download operation information for downloading a file in an operational system server, redirect said download operation to said file server, save a real copy of the downloaded file in said safety space and enumerate a corresponding virtual copy in said safety space;

said file server operable to save the real copy of the file downloaded by different user accounts, and the real copy of the file downloaded by different user accounts is saved in the private space corresponding to the user account in the safety space.

Advantageously, said local user terminal comprises:

an information acquisiting module operable to obtain download operation information for downloading a file in an operational system server, obtain access request information for accessing a virtual copy in safety space or obtain logging-out instruction information;

a judging module operable to judge whether said access request information is legal or not;

a redirecting module operable to redirect said download operation to a file server with safety space or allow to access a corresponding virtual copy and redirect all operations on the virtual copy to said real copy when said access request information is legal;

a processing module operable to save the real copy of the downloaded file in said safety space and enumerate the corresponding virtual copy in said safety space;

a session logging-out module operable to delete said virtual copy when receiving said logging-out instruction information.

The advantageous effects of the present invention are as follows: the operations on the local file are redirected to the operations on the network file in a network file storage system by means of redirecting the download operation on the file in the operational system server to the file server instead of being saved in the local user terminal "Not to local" effect for the key file is achieved; even if it has been power-off and then restarted, the data will not be saved in the local user terminal, so as to achieve an effect close to "physical-like isolation", which solves the safety problems of the offline key file much better.

BRIEF DESCRIPTIONS OF THE DRAWINGS

The present invention will be further illustrated combining with the following accompanying drawings and embodiments. In the figures.

DETAILED DESCRIPTION OF THE PREFERRED EMBODIMENT

Figure 1:
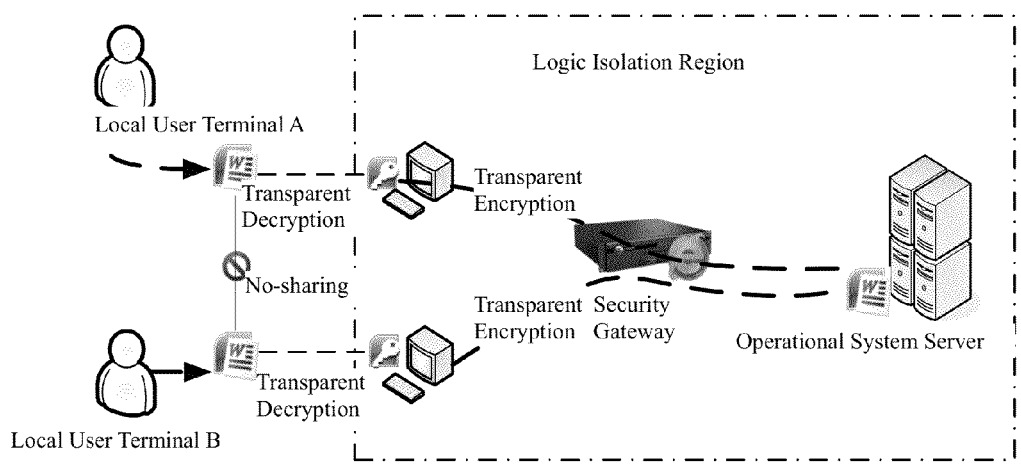
FIG. 1 is an exemplary diagram for the logic isolation system of the traditional sandbox technology.
Figure 2:
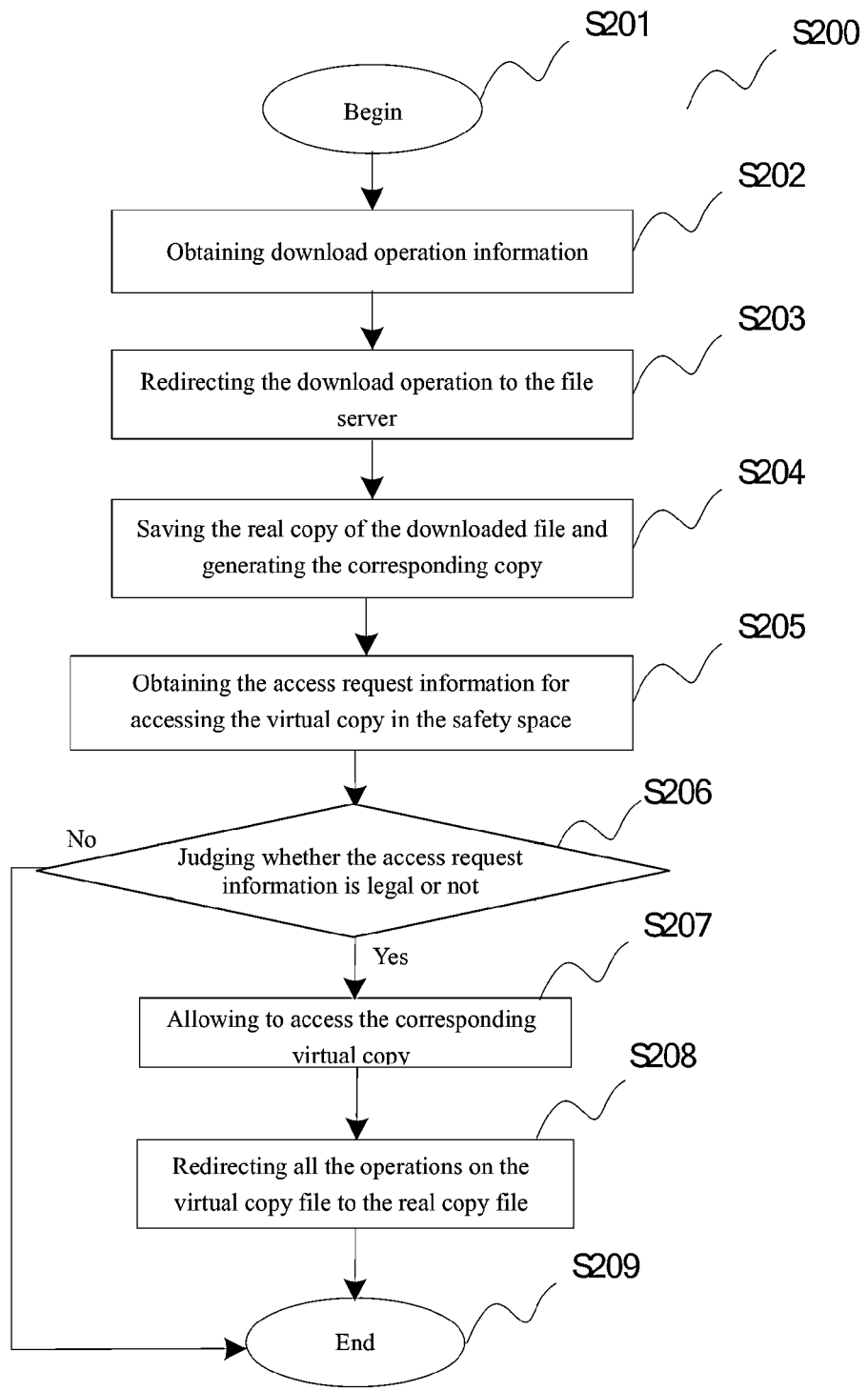
FIG. 2 is a flow chart of the method for accessing remote files in a preferred embodiment of the present invention.

The flow chart of the method for accessing remote files in an embodiment of the present invention is as shown in FIG. 2. The method S200 begins at the step S201.

In step S202, download operation information for downloading a file in an operational system server is obtained. Among it, the operational system server is a server that is connected with a local user terminal through a network, in which a plurality of file information is stored to be shared by different local user terminals. The local user terminals with access authority access the operational system server via a security gateway and download the file in the operational system server. Before the step S202, the authority for downloading the file in the operational system server by the user is judged at first. Only the users with the corresponding authority are allowed to access the operational system server and download a key file. The judging method is not limited here.

In step 203, a download operation is redirected to a file server with safety space. Among it, the file server, a server that is connected with the local user terminal and the operational system server through a network, is completely independent of local memory devices including a USB peripheral, a mobile HDD etc. The local user terminal accesses the file server via a security gateway. Preferably, a plurality of private spaces one-to-one corresponding to different user accounts are set in the safety space of the file server and used for storing a real copy downloaded by the corresponding user account respectively.

In step 204, the real copy of the downloaded file is saved in the safety space and the corresponding virtual copy is enumerated in the safety space.

When the download operation of the user is redirected to the file server, the real copy of the file downloaded from the operational system server is directly saved in the corresponding private space of the file server instead of in the local user terminal, to realize the "not to local" effect for the key file. Even when the local user terminal has been power-off and then restarted, the data will not be saved in the local machine to achieve an effect close to "physical-like isolation".

In a further embodiment, the method S200 also comprises a step S205. In step 205, access request information is obtained for accessing the virtual copy in the safety space. The access request information can be from the same account or different accounts that have downloaded the above mentioned real copy.

In step 206, the access request information is judged whether to be legal or not. According to the settings for the access authority of different accounts in the local user terminal, it is judged whether the account that has sent the access request information has the authority of accessing the virtual copy or not.

In step S207, if the account is judged to have the access authority in step 206, it is allowed to access the corresponding virtual copy; if not, the method is directly going to the end.

In step S208, all operations on the virtual copy are redirected to the real copy. After the step 204, that is, when the downloading has been finished, if the same user will perform some operations on the downloaded virtual copy immediately, the step 208 can be directly executed.

The method S200 ends at step S209.

In the above mentioned method S200, the method S200 further comprises the steps: obtaining logging-out instruction information and deleting the virtual copy. That is, when one operation session has been completed, the accessed virtual copy can be deleted according to the instruction of the local user terminal. Meanwhile, no trace exists in the local user terminal to strictly protect the security of the operated file.

In the above mentioned method S200, since the accesses of the local user terminal to the operational system server and the file server are both based on the network, the file server can be accessed via a security gateway and the corresponding virtual copy can be operated by different local user terminals. In order to realize a centralized strategy management, suitable file sharing mechanism can be set up in the local user terminal to control the access security level of different user accounts.

In the above mentioned method, the redirecting for the files can be achieved by hooking ntdll.dll, IFS (Industrial and Financial System), DiskFilter, etc. or utilizing technologies of SystemCall-Hook, VT (Vanderpool), etc. But, in the method of the present invention, it is not limited on which layer should the API (Application Programming Interface) hook is hooked in the local user terminal. API hooks of different layers can be hooked in the local user terminal or the hooking can be achieved by a drive, all of which should be within the scope of the method in the present invention.

In the above mentioned method, the file operation in a remote file server can be depended on the existing file sharing software such as Filehare or file sharing protocol such as NFS (Network File System), etc., or can be realized by achieving an agent of one server on its own. The network file system protocol for realizing the remote file operation is not limited in the present invention. For instance, all of the FileShare, NFS or other customized network file system protocols employed to realize the remote file operation should be within the scope of the method in the present invention.

Compared with the prior art, the method for remote file access in the present invention has the following advantages:

(1) In the aspect of off line security, there is no offline data in the local user terminal in the method. When the user has logged off the safety space, the user in the local user terminal cannot access any key files that can be accessed only on line in the case of without authority. However, in the prior art, there is offline file, the security of which has to depend on the complexity of the encryption algorithm.

(2) In the aspect of redirecting technology, in the method, the same as operating the local file, the user can access the key file on line in the safety space. Besides, the access speed depends on the network speed, which can be optimized by combining with WAN acceleration program. However, in the prior art, the access speed also depends on the complexity of the encryption algorithm.

(3) In the aspect of reusing key file, in the method, the key file in the safety space can be accessed continuously when the user is on line next time. However, in the prior art, there is the possibility that the encrypted key file is supposed to be deleted. Besides, the user has to log in the same local user terminal to access the key file. Additionally, the disk formatting of the local user terminal will damage the key file;

(4) In the aspect of sharing strategy, in the method, the key file in the safety space can be provided to other authorized users for accessing by means of flexible strategy configuration, which can be controlled by network file system protocol. However, in the prior art, it is based on the key-managing of the encryption algorithm and the dencrypted file delivery.

(5) In the aspect of office assistance (OA), in the method, the authorized user can modify the key file in the safety space through the policy control of "padlocking" and "unlocking" at the same time. However, in the prior art, OA is achieved only through artificial duplication and delivery.

According to the above mentioned five comparisons, it is known that by employing the method of the present invention, the usability demand of not changing the user's operation habit is also capable of being met on the basis of meeting the security demand of the key file "not to local". The "physical-like isolation" effects of both security and mobility are achieved and the security problems of offline key file are solved much better.

Figure 3:
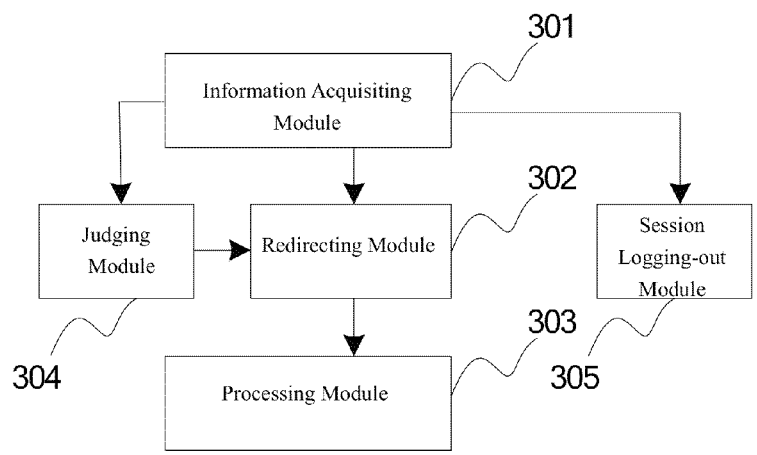
FIG. 3 is a schematic diagram for the apparatus for accessing remote files in a preferred embodiment of the present invention.

In another embodiment of the present invention, an apparatus for accessing remote files achieved by employing the method for accessing remote files in the aforesaid embodiment is provided. As shown in FIG. 3, the apparatus comprises an information acquisiting module 301, a redirecting module 302 and a processing module 303. Among it, the information acquisiting module 301, the redirecting module 302 and the processing module 303 can be achieved utilizing hardware or software.

The information acquisiting module 301 is used for obtaining download operation information for downloading a file in an operational system server. Among it, the operational system server is a server that is connected with the local user terminal through a network, in which a plurality of file information shared by different local user terminals is stored. The local user terminal accesses the operational system server via a security gateway and can download the file in the operational system server.

The redirecting module 302 is used for redirecting the download operation to a file server with safety space. Among it, the file server is a server that is connected with the local user terminal and the operational system server through a network. The file server is completely independent of the local memory device including a USB peripheral. The local user terminal accesses the file server via a security gateway. Preferably, a plurality of private spaces one-to-one corresponding to different user accounts are set in the safety space of the file server and are used for storing the real copy downloaded by the corresponding user account.

The processing module 303 is used for saving the real copy of the downloaded file in the safety space and enumerating a corresponding virtual copy in the safety space. When the user's download operation is redirected to the file server, the real copy of the file downloaded from the operational system server is directly saved in the corresponding private space of the file server instead of in the local user terminal, to realize the "not to local" effect for the key file. Even when the local user terminal is power-off and then restarted, the data willnot be saved in the local machine to achieve an effect close to "physical-like isolation".

In a further embodiment, the apparatus for accessing remote files also comprises a judging module 304. The information acquisiting module 301 is also used for obtaining access request information for accessing the virtual copy in the safety space. The access request information can be from the same account that has downloaded the above mentioned real copy and can also be from different accounts. The judging module 304 is used for judging whether the access request information is legal or not. The redirecting module 302 is also used for allowing to access the corresponding virtual copy and redirecting all the operations on the virtual copy to the real copy when the access request information is legal.

In a further embodiment, the apparatus for accessing remote files also comprises a session logging-out module 305. The information acquiring module 301 is also used for obtaining logging-out instruction information. The session logging-out module 305 is used for deleting the virtual copy when receiving the logging-out instruction information. That is, when one operation session has been finished, the virtual copy can be deleted according to the instruction of the local user terminal. Meanwhile, no trace exists in the local user terminal to strictly protect the security of the operated file.

The apparatus for accessing remote files in the above mentioned embodiments can be set in a plurality of local user terminals that is connected with the operational system server through a network. Since the accesses of the local user terminal to the operational system server and the file server are both based on network, the file server can be accessed via a security gateway and the corresponding virtual copy can be operated in different local user terminals. In order to realize a centralized strategy management. Suitable file sharing mechanism can be set up in the local user terminal to control the access security level of different user accounts.

Compared with the existing sandbox technology, the apparatus for accessing remote files in the above mentioned embodiments likewise has the five advantages described in the aforesaid embodiment. Therefore, the usability demand of not changing the user's operation habit is also capable of being met on the basis of meeting the security demand of the key file "not to local" employing the apparatus for accessing remote files. The "physical-like isolation" effects of both security and mobility are achieved and the security problems of offline key file are solved much better.

Figure 4:
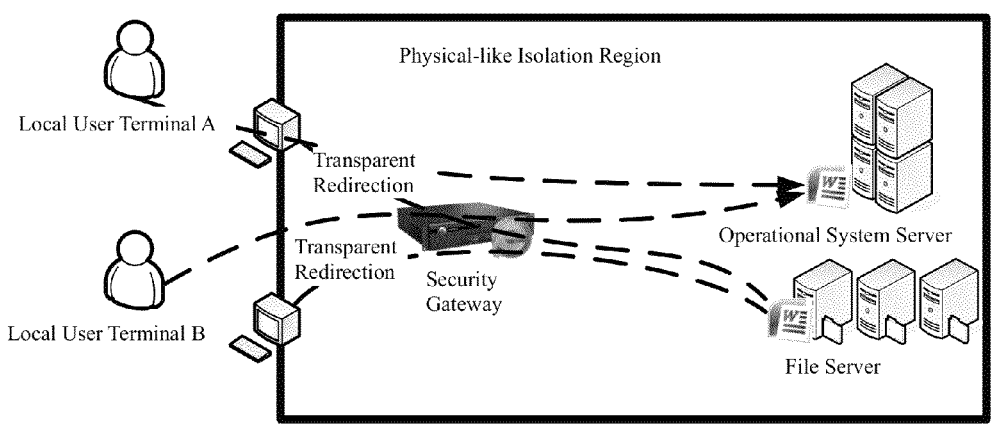
FIG. 4 is a schematic diagram for the system for accessing remote files in a preferred embodiment of the present invention.

In another embodiment of the present invention, a system for accessing remote files is provided. As shown in FIG. 4, the system comprises a local user terminal and an operational system server in which has stored remote files; the system also comprises a file server with safety space. The local user terminal is used for obtaining download operation information for downloading a file in an operational system server, redirecting the download operation to a file server, saving the real copy of the downloaded file in the safety space and enumerating a corresponding virtual copy in the safety space. The file server is used for saving the real copy of the file downloaded by different user accounts, and the real copy of the file downloaded by different user accounts is saved in the private spaces corresponding to the user accounts in the safety space.

Among it, the local user terminal comprises the apparatus for accessing remote files in the previous embodiments. Referring to FIG. 3, the local user terminal specifically comprises an information acquisiting module 301, a judging module 304, a redirecting module 302, a processing module 303 and a session logging-out module 305. Among it, the information acquisiting module 301 is used for obtaining the download operation information for downloading the file in the operational system server, obtaining the access request information for accessing the virtual copy in said safety space or obtaining logging-out instruction information; the judging module 304 is used for judging whether the access request information is legal or not; the redirecting module 302 is used for redirecting the download operation to the file server with safety space or allowing to access the corresponding virtual copy and redirecting all operations on the virtual copy to the real copy when the access request information is legal; the processing module 303 is used for saving the real copy of the downloaded file in the safety space and enumerating the corresponding virtual copy in the safety space; the session logging-out module 305 is used for deleting the virtual copy when receiving the logging-out instruction information. The specific embodiments can be found in the descriptions of the aforesaid embodiments, which are not repeated here.

In the embodiment of the system for accessing remote files, the "not to local" effect for the key file is achieved by redirecting the local file operation to network file operation of the network file storage system. Even when it is power-off and then restarted, the data will not be saved in the local machine to realize the effect almost close to "physical-like isolation". As shown in FIG. 4, the physical-like isolation region is composed of an operational system server, a file server and a security gateway that realizes the operational system server, the file server and the local user terminal. The specific implementation method can be found in the descriptions of the aforesaid embodiments, which are not repeated here.

As shown in FIG. 4, if the apparatuses for accessing remote files in the aforesaid embodiments are set in both local user terminal A and the local user terminal B, the virtual copy of the downloaded key file can be accessed and operated by authorized account in the local user terminal B when the key file has been downloaded in the local user terminal A. Likewise, in order to realize a centralized strategy management, suitable file sharing mechanism can be set up in the local user terminal to control the access security level of different user accounts.

In conclusion, in the present invention, local file operations are redirected to the network file operations of the network file storage system by redirecting the download operation on the file in the operational system server to the file server instead of being saved in the local user terminal to realize the "Not to local" effect for the key file. Even if it is power-off and then restarted, the data will not be saved in the local user terminal to achieve an effect close to "physical-like isolation", which solves the safety problems of the offline key file much better.

It should be understood that improvement or alternations can be made according to the above mentioned descriptions for one of the ordinary skill in the art, without departing from the scope of the claims appended in the present invention.

What is claimed is:

1. A method for accessing remote files, the method comprising:
   obtaining download operation information for a local user terminal downloading a file in an operational system server; wherein, the operation system server is a server that is connected with the local user terminal through a network, in which a plurality of file information is stored to be shared by different local user terminals;
   redirecting said download operation implemented by the local user terminal to a file server with safety space; wherein, the file server is connected with the local user terminal and the operational system server through a network respectively, is independent of local memory devices; wherein a plurality of private spaces corresponding one-to-one to different user accounts are set in said safety space; each of said plurality of private spaces is used to store the real copy downloaded by the corresponding user account respectively;
   saving a real copy of the file downloaded from the operational system server by the file server in said safety space and enumerating a corresponding virtual copy in said safety space;
   wherein the method further comprises:
   obtaining access request information for accessing the virtual copy in said safety space;

obtaining logging-out instruction information and deleting said virtual copy;
judging whether said access request information is legal or not;
if so, allowing access to the corresponding virtual copy; and
redirecting all operations on the virtual copy to said real copy.

2. An apparatus for accessing remote files comprising:
an information acquisition module operable to obtain download operation information for a local user terminal and download a file in an operational system server, wherein, the operation system server is a server that is connected with the local user terminal through a network in which a plurality of file information is stored to be shared by different local user terminals, said information acquisition module also operable to obtain logging-out instruction information, said information acquisition module also operable to obtain access request information for accessing a virtual copy in said safety space;
a redirecting module operable to redirect said download operation implemented by the local user terminal to a file server with safety space, said redirecting module operable to allow access to the corresponding virtual copy and redirect all operations on the virtual copy to said real copy when said access request information is legal;
a session logging-out module, said session logging-out module operable to delete said virtual copy when receiving said logging-out instruction information;
a processing module operable to save a real copy of the file downloaded from the operational system server by the file server in said safety space and enumerate the corresponding virtual copy in said safety space;
a judging module, said judging module operable to judge whether said access request information is legal; and
a plurality of private spaces one-to-one corresponding to different user accounts are set in said safety space, each of said plurality of private spaces is used to store the real copy downloaded by the corresponding user account respectively.

3. A system for accessing remote files, the system comprising a local user terminal and an operational system server in which stored remote files, wherein the system also comprising a file server with safety space; said local user terminal connects with said file server and said operational system server via a security gateway; wherein, said local user terminal operable to obtain download operation information for the local user terminal downloading a file in an operational system server, redirect said download operation implemented by the local user terminal to said file server, save a real copy of the file downloaded from the operational system server by the file server in said safety space and enumerate a corresponding virtual copy in said safety space; said file server operable to save the real copy of the file downloaded by different user accounts, and the real copy of the file downloaded by different user accounts is saved in the private space corresponding to the user account in the safety download wherein, the file server, a server that is connected with the local user terminal and the operational system server through a network respectively, is completely independent of local memory devices,
wherein the system further comprises:
obtaining access request information for accessing the virtual copy in said safety space;
obtaining logging-out instruction information and deleting said virtual copy;
judging whether said access request information is legal or not;
if so, allowing access to the corresponding virtual copy; and
redirecting all operations on the virtual copy to said real copy.

* * * * *